United States Patent
Ding et al.

(10) Patent No.: US 12,259,837 B2
(45) Date of Patent: Mar. 25, 2025

(54) USB POWER SUPPLY CIRCUIT WITH IDLE POWER DISTRIBUTION AND THE METHOD THEREOF

(71) Applicant: Chengdu Monolithic Power Systems Co., Ltd., Chengdu (CN)

(72) Inventors: Peijian Ding, Chengdu (CN); Junyong Gong, Chengdu (CN); Huan Liu, Chengdu (CN); Shuai Yuan, Chengdu (CN)

(73) Assignee: Chengdu Monolithic Power Systems Co., Ltd., Sichuan (CN)

( * ) Notice: Subject to any disclaimer, the term of this patent is extended or adjusted under 35 U.S.C. 154(b) by 33 days.

(21) Appl. No.: 18/297,430

(22) Filed: Apr. 7, 2023

(65) Prior Publication Data
US 2023/0342317 A1     Oct. 26, 2023

(30) Foreign Application Priority Data
Apr. 26, 2022   (CN) .................. 202210447974.9

(51) Int. Cl.
G06F 13/14   (2006.01)
G06F 13/38   (2006.01)

(52) U.S. Cl.
CPC .... G06F 13/382 (2013.01); *G06F 2213/0042* (2013.01)

(58) Field of Classification Search
CPC ........... G06F 13/382; G06F 2213/0042; G06F 13/4282; H02J 1/00; H02M 3/04
See application file for complete search history.

(56) References Cited

U.S. PATENT DOCUMENTS

| | | | |
|---|---|---|---|
| 2016/0352101 A1* | 12/2016 | Koo | H02J 1/12 |
| 2017/0277251 A1 | 9/2017 | Gong | |
| 2020/0257345 A1* | 8/2020 | Wang | G06F 13/4282 |
| 2021/0218261 A1* | 7/2021 | Kofman | H02J 7/00712 |
| 2022/0102999 A1 | 3/2022 | Sporck et al. | |
| 2023/0268744 A1* | 8/2023 | Wang | H02J 7/02 307/11 |
| 2023/0342317 A1* | 10/2023 | Ding | G06F 13/382 |

* cited by examiner

*Primary Examiner* — Henry Tsai
*Assistant Examiner* — Kim T Huynh
(74) *Attorney, Agent, or Firm* — Perkins Coie LLP

(57) ABSTRACT

A USB power supply circuit is discussed. The circuit has at least two power converters and a controller. The controller controls the power converters to provide required output powers to devices attached to the controller and monitors the provided output powers. If one of the power converters has an idle power margin, the idle power margin would be distributed to other power converters.

14 Claims, 2 Drawing Sheets

USB POWER SUPPLY CIRCUIT WITH IDLE POWER DISTRIBUTION AND THE METHOD THEREOF

CROSS-REFERENCE TO RELATED APPLICATIONS

This application claims priority to and the benefit of Chinese Patent Application No. 202210447974.9, filed Apr. 26, 2022, which is incorporated herein by reference in its entirety.

BACKGROUND OF THE INVENTION

Universal serial bus (USB) power delivery is a protocol specification supports both data communication and power delivery as high as 100 W or 240 W. USB type-C is a new reversible USB connector specification, which supports a number of new standards including USB 3.1 (the first generation Gen1 and the second generation Gen2), Display Port and USB power delivery. Each USB type-C port has a default 15 W (5V voltage and 3 A current) highest power support. If the USB power delivery is realized in the USB type-C port, the USB type-C can support a higher power.

A power product with dual USB type-C ports has a fixed maximum output power at the beginning of the design. However to distribute the output power of each USB type-C port, so that al devices attached to the connectors can get their desired power, is a challenge to the field.

SUMMARY OF THE INVENTION

In accordance with an embodiment of the present invention, a USB controller is discussed. The USB controller comprises a first port and a second port. The first port is coupled to a first power converter, to control the first power converter to supply a first output power to a first device attached to the first port. The second port is coupled to a second power converter, to control the second power converter to supply a second output power to a second device attached to the second port. The first power converter and the second power converter respectively having a first maximum output power and a second maximum output power. The controller is configured to monitor the first output power and the second output power, if the first output power is lower than the first maximum output power, the controller controls an idle power margin to the second power converter; and if the second output power is lower than the second maximum output power, the controller controls the idle power margin to the first power converter.

In addition, in accordance with an embodiment of the present invention, a USB power supply circuit is discussed. The USB power supply circuit comprises: n power converters and a controller having n ports. The n power converters are configured to provide an output voltage, respectively. N is an integer larger than 1. Each of the power converters has a maximum output power. The n ports are respectively coupled to the n power converters, to control the n power converters to respectively supply an output power to n devices respectively attached to the n ports. The controller is configured to monitor the output powers of each of the power converters, if one of the power converter or some of the power converters have an output power lower than their maximum output power, the controller distributes an idle power margin to other power converters.

Furthermore, in accordance with an embodiment of the present invention, a method used in a USB power supply circuit is discussed. The USB power supply circuit has n power converters and a controller having n ports, wherein n is an integer larger than 1. Each of the ports is respectively coupled to the n power converters, and is respectively attachable with a device. Each of the power converters having a maximum output power. The method comprises: handshaking with each device attached to the port, to establish a power delivery protocol between the port and the device, and to control the corresponding power converter to provide a required power to the device; and monitoring actual output powers at each of the ports when two devices or more devices are attached to the controller: if one of the ports has an output power lower than its maximum output power, distributing an idle power margin to other ports.

DETAILED DESCRIPTION OF THE INVENTION

Embodiments of circuits for brushless DC motor are described in detail herein. In the following description, some specific details, such as example circuits for these circuit components, are included to provide a thorough understanding of embodiments of the invention. One skilled in relevant art will recognize, however, that the invention can be practiced without one or more specific details, or with other methods, components, materials, etc.

The following embodiments and aspects are illustrated in conjunction with circuits and methods that are meant to be exemplary and illustrative. In various embodiments, the above problem has been reduced or eliminated, while other embodiments are directed to other improvements.

Figure 1:
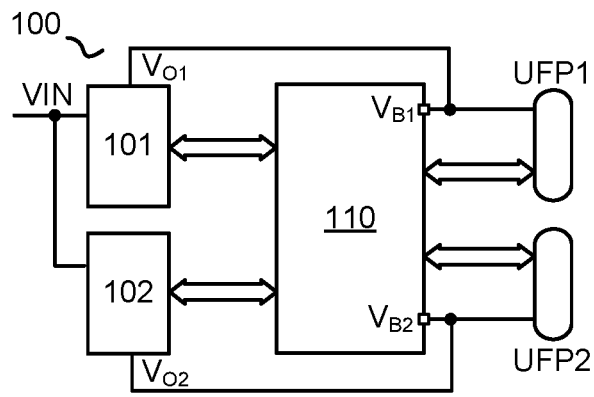
FIG. 1 schematically shows a USB power supply circuit 100 in accordance with an embodiment of the present invention.

FIG. 1 schematically shows a USB power supply circuit 100 in accordance with an embodiment of the present invention. In the example of FIG. 1, the USB power supply circuit 100 comprises: a first power converter 101, configured to provide a first output voltage $V_{O1}$; a second power converter 102, configured to provide a second output voltage $V_{O2}$; and a controller 110, having a first port $V_{B1}$ coupled to the first output voltage $V_{O1}$ and a second port $V_{B2}$ coupled to the second output voltage $V_{B2}$. The first power converter 101 and the second power converter 102 have information interaction with the controller 110, respectively, and are controlled by the controller 110.

In one embodiment of the present invention, the first port $V_{B1}$ and the second port $V_{B2}$ are USB type-C ports, which may be attached with a USB device, to charge the USB device or to communicate with the USB device. In the example of FIG. 1, a first device UFP1 is attached to the first port $V_{B1}$, and a second device UFP2 is attached to the second port $V_{B2}$. A handshake protocol is performed between the port and the attached device. If the device has a particular power requirement (e.g. 15 W, 5V/3 A), the controller 110 would control the corresponding power converter 101 or 102 to provide the 15 W power to the device.

In one embodiment of the present invention, the first power converter 101 and the second power converter 102 have a same input signal VIN.

In one embodiment of the present invention, when the first port $V_{B1}$ and the second port $V_{B2}$ set up a power delivery protocol with the device, the first power converter 101 has a first maximum output power P1, and the second power converter 102 has a second maximum output power P2. A sum of the output powers provided by the first power converter 101 and the second power converter 102 should be lower than a power capability of the input signal VIN (i.e., a maximum power provided by the input signal VIN).

In one embodiment of the present invention, the controller 110 controls the power converter to supply a required power based on the handshake protocol set up between the port and the device. The controller 110 detects the actual output power of each of the ports. If one port has an output power lower than its maximum output power, the controller 110 would distribute the idle power margin (a difference between the maximum output power and the actual output power) to the other port. For example, if the power supply at the first port $V_{B1}$ (i.e., a first output power provided by the first power converter 101) is lower than the first maximum output power P1, and the second port $V_{B2}$ has an insufficient power supply (i.e., a second output power provided by the second power converter 101 is insufficient), the controller 110 would control the second power converter 102 to supply more power, to distribute the idle power margin to the second power converter 102 from the first power converter 101.

Figure 2:
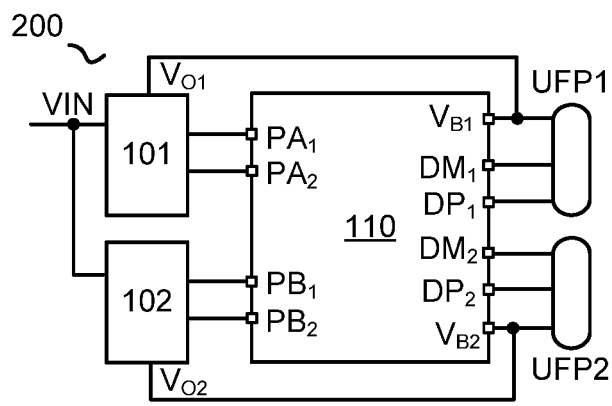
FIG. 2 schematically shows a USB power supply circuit 200 in accordance with an embodiment of the present invention.

FIG. 2 schematically shows a USB power supply circuit 200 in accordance with an embodiment of the present invention. The USB power supply circuit 200 in FIG. 2 shows partial of the ports. Specifically, in the example of FIG. 2, the controller 110 comprises the first port $V_{B1}$ and the second port $V_{B2}$. In addition, the controller 110 further comprises: a first data port group DM1 and DP1, configured to communicate with the first device UFP1; a second data port group DM2 and DP2, configured to communicate with the second device UFP2; a third data port group PA1 and PA2, configured to interact with the first power converter 101, so that the first converter 101 is controlled to supply the first output power to the first device UFP1; and a fourth data port group PB1 and PB2, configured to interact with the second power converter 102, so that the second converter 102 is controlled to supply the second output power to the second device UFP2.

In one embodiment of the present invention, the information interaction between the third data port group and the first power converter 101 (or the information interaction between the fourth data port group and the second power converter 102) comprises: controlling the corresponding power converter to provide corresponding power after the USB type-C port handshakes with the corresponding device; and monitoring the first output power provided by the first power converter 101 and the second output power provided by the second power converter 102, if the first output power is lower than the first maximum output power P1, or the second output power is lower than the second maximum output power P2, the idle power margin is controlled to be distributed to the other power converter.

The controller 110 shown in FIG. 1 and FIG. 2 has two USB type-C ports, and controls two power converters to provide powers to the devices. However, one skilled in the art should realize that the controller 110 may have more USB type-C ports, and controls more power converters to provide powers to the devices, as shown in FIG. 3.

Figure 3:
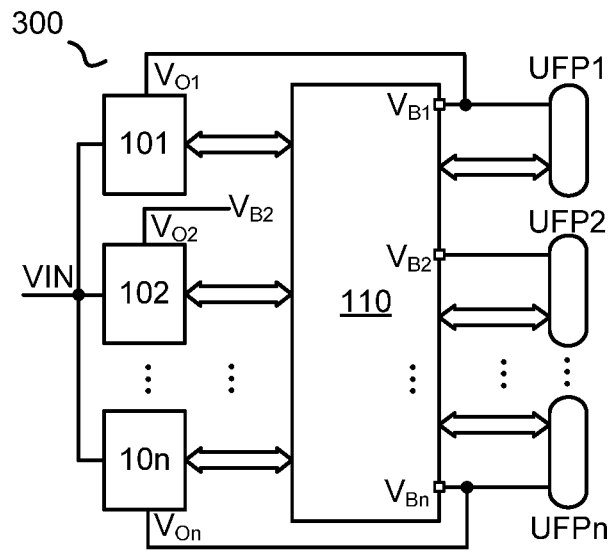
FIG. 3 schematically shows a USB power supply circuit 300 in accordance with an embodiment of the present invention.

FIG. 3 schematically shows a USB power supply circuit 300 in accordance with an embodiment of the present invention. In the example of FIG. 3, the USB power supply circuit 300 comprises: n power converters 101-10n, configured to provide n output voltages $V_{O1}$-Von, respectively, wherein n is an integer larger than 1. The USB power supply circuit 300 further comprises: a controller 110, having n ports $V_{B1}$-$V_{Bn}$, respectively coupled to the n output voltages $V_{O1}$-Von. The n power converters 101-10n respectively have information interaction with the controller 110, and are respectively controlled by the controller 110. The n ports are all USB type-c ports, and may respectively be attached with a device. As shown in FIG. 3, n devices UFP1-UFPn are respectively attached to the n ports $V_{B1}$-$V_{Bn}$. The controller 110 is configured to communicate with the n devices and to control the n power converters to provide corresponding power supplies by way of the n ports. The n power converters have a same input signal VIN.

If two ports or more ports are attached with devices, each of the ports sets up a power delivery protocol with the attached device. Each of the power converters has its maximum output power, and a sum of the output powers provided by the n power converters should be lower than a maximum power provided by the input signal VIN. The controller controls the corresponding power converter to provide a corresponding power based on the handshake protocol set up between the port and the device. Meanwhile, the controller 110 detects the actual output power at each port. If one of the port and/or some of the ports has and/or have an actual output power lower than its (their) maximum output power, the controller 110 would distribute the idle power margin to other ports. The controller 110 further controls each of the power converters, to make sure the output power provided by each of the power converters is lower than their maximum output power.

Figure 4:
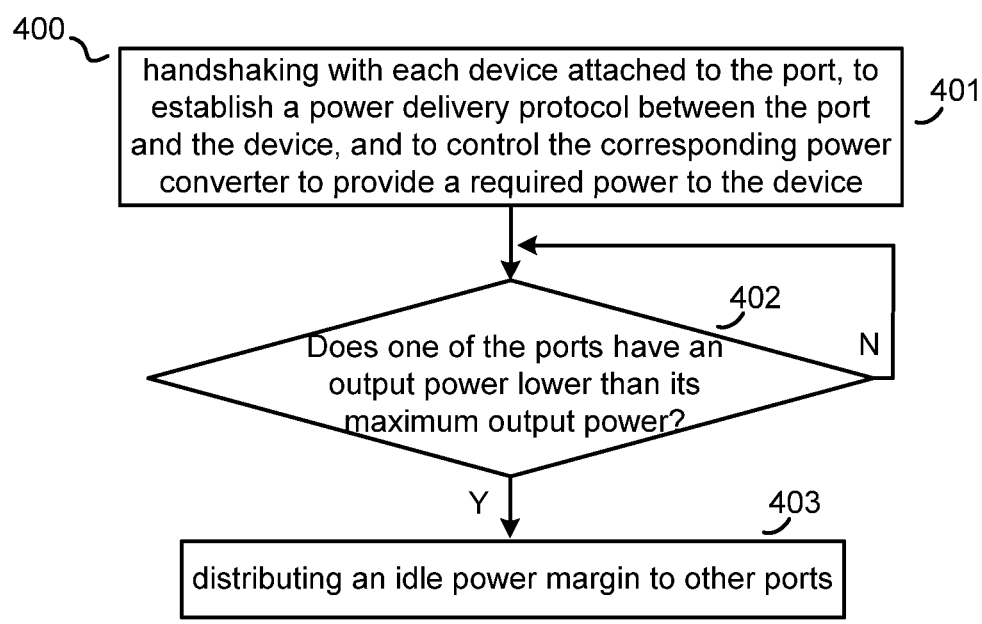
FIG. 4 schematically shows a flowchart 400 of a method used in a USB power supply circuit in accordance with an embodiment of the present invention.

FIG. 4 schematically shows a flowchart 400 of a method used in a USB power supply circuit in accordance with an embodiment of the present invention. The USB power supply circuit comprises n power converters and a controller having n ports, wherein n is an integer larger than 1, and wherein each of the ports is respectively coupled to the n power converters, and is respectively attachable with a device. Each of the power converters has a maximum output power. The method comprises:

Step 401, handshaking with each device attached to the port, to establish a power delivery protocol between the port and the device, and to control the corresponding power converter to provide a required power to the device.

Step 402, monitoring actual output powers at each of the ports when two devices or more devices are attached to the controller: if one of the ports has an output power lower than its maximum output power, going to step 403. And Step 403, distributing an idle power margin to other ports.

In one embodiment of the present invention, the method further comprises: ensuring the output power at each port to be lower than the maximum output power of the corresponding power converter.

In one embodiment of the present invention, the method further comprises: ensuring a sum of the output powers of all of the n power converters to be lower a power capability of an input signal. The input signal is supplied to all of the n power converters.

Several embodiments of the forgoing USB power supply circuit monitoring the actual output power at each port to dynamically regulate the power distribution between different ports. When one port has an actual output power lower than its maximum output power, the idle power is distribute to other ports. Thus, the power supply requirement is satisfied.

It is to be understood in these letters patent that the meaning of "A" is coupled to "B" is that either A and B are connected to each other as described below, or that, although A and B may not be connected to each other as described above, there is nevertheless a device or circuit that is connected to both A and B. This device or circuit may include active or passive circuit elements, where the passive circuit elements may be distributed or lumped-parameter in nature. For example, A may be connected to a circuit element that in turn is connected to B.

This written description uses examples to disclose the invention, including the best mode, and also to enable a person skilled in the art to make and use the invention. The patentable scope of the invention may include other examples that occur to those skilled in the art.

The invention claimed is:

1. A USB controller, comprising:
a first port, coupled to a first power converter, to control the first power converter to supply a first output power to a first device attached to the first port; and
a second port, coupled to a second power converter, to control the second power converter to supply a second output power to a second device attached to the second port; the first power converter and the second power converter respectively having a first maximum output power and a second maximum output power, wherein:
the controller is configured to monitor the first output power and the second output power, if the first output power is lower than the first maximum output power, the controller controls an idle power margin to the second power converter; and if the second output power is lower than the second maximum output power, the controller controls the idle power margin to the first power converter.

2. The USB controller of claim 1, wherein:
the controller is configured to control the first output power to keep lower than the first maximum output power, and to control the second output power to keep lower than the second maximum output power.

3. The USB controller of claim 1, wherein:
both the first port and the second port are USB type-C ports.

4. The USB controller of claim 1, further comprising:
a first data port group, configured to communicate with the first device; and
a second data port group, configured to communicate with the second device.

5. The USB controller of claim 4, further comprising:
a third data port group, configured to interact with the first power converter, so that the first converter is controlled to supply the first output power to the first device; and
a fourth data port group, configured to interact with the second power converter, so that the second converter is controlled to supply the second output power to the second device.

6. The USB controller of claim 1, wherein:
the first power converter and the second power converter have a same input signal; and
the controller is configured to control a sum of the first output power and the second output power to be lower a power capability of the input signal.

7. A USB power supply circuit, comprising:
n power converters, configured to provide an output voltage, respectively, wherein n is an integer larger than 1, and wherein each of the power converters has a maximum output power; and
a controller, having n ports, respectively coupled to the n power converters, to control the n power converters to respectively supply an output power to n devices respectively attached to the n ports; wherein the controller is configured to monitor the output powers of each of the power converters, if one of the power converter or some of the power converters have an output power lower than their maximum output power, the controller distributes an idle power margin to other power converters.

8. The USB power supply circuit of claim 7, wherein:
the controller is configured to control each of the power converters to have the output power be lower than its maximum output power.

9. The USB power supply circuit of claim 7, wherein:
the n ports are USB type-C ports.

10. The USB power supply circuit of claim 7, wherein:
the n power converters have a same input signal; and
the controller is configured to control a sum of the output powers of all of the n power converters to be lower a power capability of the input signal.

11. A method used in a USB power supply circuit, the USB power supply circuit having n power converters and a controller having n ports, wherein n is an integer larger than 1, and wherein each of the ports is respectively coupled to the n power converters, and is respectively attachable with a device; each of the power converters having a maximum output power; the method comprising:
handshaking with each device attached to the port, to establish a power delivery protocol between the port and the device, and to control the corresponding power converter to provide a required power to the device; and
monitoring actual output powers at each of the ports when two devices or more devices are attached to the controller: if one of the ports has an output power lower than its maximum output power, distributing an idle power margin to other ports.

12. The method of claim 11, further comprising:
ensuring the output power at each port to be lower than the maximum output power of the corresponding power converter.

13. The method of claim 11, further comprising:
ensuring a sum of the output powers of all of the n power converters to be lower a power capability of an input signal, wherein the input signal is supplied to all of the n power converters.

14. The method of claim 11, wherein:
the n ports are USB type-C ports.

* * * * *